(12) United States Patent
Lee et al.

(10) Patent No.: US 9,287,545 B2
(45) Date of Patent: Mar. 15, 2016

(54) SEPARATOR, MANUFACTURING METHOD OF THE SAME, AND ELECTROCHEMICAL DEVICE HAVING THE SAME

(71) Applicants: LG Chem, Ltd., Seoul (KR); Toray Battery Separator Film Co., Ltd., Tochigi (JP)

(72) Inventors: Joo-Sung Lee, Daejeon (KR); Jong-Hun Kim, Daejeon (KR); Jin-Woo Kim, Daejeon (KR)

(73) Assignees: LG Chem, Ltd. (KR); Toray Battery Separator Film Co., Ltd. (JP)

( * ) Notice: Subject to any disclaimer, the term of this patent is extended or adjusted under 35 U.S.C. 154(b) by 115 days.

(21) Appl. No.: 13/851,643

(22) Filed: Mar. 27, 2013

(65) Prior Publication Data

US 2013/0244082 A1    Sep. 19, 2013

Related U.S. Application Data

(63) Continuation of application No. PCT/KR2012/005829, filed on Jul. 20, 2012.

(30) Foreign Application Priority Data

Jul. 20, 2011 (KR) .................. 10-2011-0071799
Jul. 20, 2012 (KR) .................. 10-2012-0079209

(51) Int. Cl.
*H01M 2/16* (2006.01)
*H01M 2/14* (2006.01)
(Continued)

(52) U.S. Cl.
CPC ............ *H01M 2/1686* (2013.01); *H01M 2/145* (2013.01); *H01M 2/166* (2013.01);
(Continued)

(58) Field of Classification Search
CPC . H01M 2/1686; H01M 2/145; H01M 2/1646; H01M 2/1673; H01M 4/485; H01M 4/5825; H01M 4/622; H01M 4/623; H01M 4/625
USPC .................................. 429/145, 144; 427/58
See application file for complete search history.

(56) References Cited

U.S. PATENT DOCUMENTS 6,489,053 B1    12/2002  Horie et al.
2007/0190408 A1  8/2007  Inoue et al.
(Continued)

FOREIGN PATENT DOCUMENTS

EP       0848445 A1    6/1998
JP       H6-140077     5/1994
(Continued)

OTHER PUBLICATIONS

International Search Report for Application No. PCT/KR2012/005829 dated Jan. 29, 2013.
(Continued)

*Primary Examiner* — Karie O'Neill Apicella
(74) *Attorney, Agent, or Firm* — Lerner, David, Littenberg, Krumholz & Mentlik, LLP (57) ABSTRACT

The separator of the present invention comprises a porous composite having a porous substrate and a first porous coating layer formed on at least one surface of the porous substrate and comprising a mixture of inorganic particles and a first binder polymer; and a second porous coating layer formed on a first surface of the porous composite and comprising a mixture of cathode active material particles, a second binder polymer and a first conductive material, a third porous coating layer formed on a second surface of the porous composite and comprising a mixture of anode active material particles, a third binder polymer and a second conductive material, or both of the second porous coating layer and the third porous coating layer. Also, the separator of present invention may further comprise a fourth porous coating layer formed on at least one outermost surface thereof and comprising a fourth binder polymer.

18 Claims, 2 Drawing Sheets

(51) Int. Cl.
  *H01M 4/485* (2010.01)
  *H01M 4/58* (2010.01)
  *H01M 4/62* (2006.01)
  *H01M 10/0525* (2010.01)

(52) U.S. Cl.
  CPC .......... *H01M2/1646* (2013.01); *H01M 2/1673* (2013.01); *H01M 4/485* (2013.01); *H01M 4/5825* (2013.01); *H01M 4/622* (2013.01); *H01M 4/623* (2013.01); *H01M 4/625* (2013.01); *H01M 10/0525* (2013.01); *Y02E 60/122* (2013.01)

(56) References Cited

U.S. PATENT DOCUMENTS

| | | | |
|---|---|---|---|
| 2008/0248387 A1* | 10/2008 | Hinoki et al. | 429/209 |
| 2009/0111025 A1 | 4/2009 | Lee et al. | |
| 2010/0003590 A1 | 1/2010 | Park et al. | |
| 2010/0291430 A1* | 11/2010 | Lee et al. | 429/129 |

FOREIGN PATENT DOCUMENTS

| | | |
|---|---|---|
| JP | H9-27343 | 1/1997 |
| JP | 2001-052753 A | 2/2001 |
| JP | 2005-267952 A | 9/2005 |
| JP | 2008-524824 A | 7/2008 |
| JP | 2010-129194 A | 6/2010 |
| KR | 10-0271116 | 11/2000 |
| KR | 20070019958 A | 2/2007 |
| KR | 20080101043 A | 11/2008 |
| KR | 20090012134 A | 2/2009 |
| KR | 20090051546 A | 5/2009 |
| KR | 20090054385 A | 5/2009 |
| KR | 20090088636 A | 8/2009 |
| KR | 20110075631 A | 7/2011 |
| WO | 2011081416 | 7/2011 |

OTHER PUBLICATIONS

Lithium Secondary Battery, Mar. 20, 2008, The 1st edition publication, p. 96.

* cited by examiner

SEPARATOR, MANUFACTURING METHOD OF THE SAME, AND ELECTROCHEMICAL DEVICE HAVING THE SAME

CROSS-REFERENCE TO RELATED APPLICATION

The present application is a continuation of International Application No. PCT/KR2012/005829 filed on Jul. 20, 2012, which claims priority to Korean Patent Application Nos. 10-2011-0071799 and 10-2012-0079209 filed in the Republic of Korea on Jul. 20, 2011 and Jul. 20, 2012, respectively, the disclosures of which are incorporated herein by reference.

TECHNICAL FIELD

The present invention relates to a separator used in an electrochemical device such as a lithium secondary battery, a method for manufacturing the same and an electrochemical device having the same. More particularly, the present invention relates to a separator in which porous coating layers comprising a mixture of inorganic particles and a binder polymer are formed on the surface of a porous substrate, a method for manufacturing the same and an electrochemical device having the same.

BACKGROUND ART

Recently, there has been an increasing interest in energy storage technology. As energy storage technologies are extended to devices such as cellular phones, camcorders and notebook PC, and further to electric vehicles, demand for the research and development of electrochemical devices is increasing. In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause electrical short between a cathode and an anode.

In order to solve the above safety problems of electrochemical devices, a separator comprising a highly porous substrate and a porous organic/inorganic composite coating layer formed on at least one surface of the porous substrate by coating with a mixture of inorganic particles and a binder polymer has been proposed. For example, Korean Laid-open Patent Publication No. 2007-0019958 discloses a separator comprising a porous substrate and a porous coating layer formed on the surface of the porous substrate by using a mixture of inorganic particles and a binder polymer.

Such a porous coating layer formed on a porous substrate contributes to the improvement of safety in electrochemical devices. In the prior art, inorganic particles such as $BaTiO_3$, $Pb(Zr,Ti)O_3$ (PZT), $ZrO_2$, $SiO_2$, $Al_2O_3$, $TiO_2$, lithium phosphate ($Li_3PO_4$) and lithium titanium phosphate ($Li_xTi_y(PO_4)_3$, $0<x<2$, $0<y<3$) have been used to form a porous coating layer, however, fail to improve the output of electrochemical devices due to their electrochemical characteristics. As an attempt to improve the output of electrochemical devices, Korean Laid-open Patent Publication No. 2008-101043 discloses a separator having a porous coating layer comprising active material particles.

However, the porous coating layer comprising active material particles has poor conductivity between active materials due to the use of a binder polymer and thus is preferable to further comprise a conductive material. The conductive material may have a particle size as small as several tens of nanometers, whereas a porous substrate has at least a pore size of several tens of micrometers. Therefore, the conductive material penetrates into pores of the porous substrate to provide conductivity, thereby causing a short circuit between electrodes.

DISCLOSURE

Technical Problem

Accordingly, it is an object of the present invention to provide a separator capable of improving the output of electrochemical devices with a porous layer comprising an active material together with a conductive material and preventing a short circuit due to the use of the conductive material, and a method for manufacturing the separator.

Technical Solution

In accordance with one aspect of the present invention, there is provided a separator which comprises a porous composite having a porous substrate and a first porous coating layer formed on at least one surface of the porous substrate and comprising a mixture of inorganic particles and a first binder polymer; and a second porous coating layer formed on a first surface of the porous composite and comprising a mixture of cathode active material particles, a second binder polymer and a first conductive material, a third porous coating layer formed on a second surface of the porous composite and comprising a mixture of anode active material particles, a third binder polymer and a second conductive material, or both of the second porous coating layer and the third porous coating layer.

The separator may further comprise a fourth porous coating layer formed on at least one outermost surface thereof and comprising a fourth binder polymer.

The cathode active material particles which may be used in the present invention include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein, M1 and M2 are each independently selected from the group consisting of Al, Ni, Co, Fe, Mn, V, Cr, Ti, W, Ta, Mg and Mo, x, y and z are each independently an atomic fraction of elements consisting of an oxide, and $0 \leq x < 0.5$, $0 \leq y < 0.5$, $0 \leq z < 0.5$, and $x+y+z < 1$). The anode active material particles which may be used in the present invention include natural graphite, artificial graphite, a carbon-based material, $LiTi_2O_4$, silicon (Si) and tin (Sn). Among these, the preferred cathode active material particles may be made of $LiFePO_4$ and the preferred anode active material particles may be made of $LiTi_2O_4$.

The conductive material which may be used in the present invention includes carbon black, acetylene black, Ketjen Black, Super P and carbon natotubes.

The inorganic particles which may be used in the present invention include inorganic particles having a dielectric constant of 5 or higher and inorganic particles having the ability to transport lithium ions, but are not particularly limited thereto.

Examples of the inorganic particles having a dielectric constant of 5 or higher include $BaTiO_3$, $Pb(Zr_x,Ti_{1-x})O_3$ (PZT, $0<x<1$), $Pb_{1-x}La_xZr_{1-y}Ti_yO_3$ (PLZT), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$ inorganic particles.

Also, examples of the inorganic particles having the ability to transport lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) inorganic particles.

Examples of the binder polymer which may be used in the present invention include polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan and carboxymethyl cellulose, but are not particularly limited thereto.

The porous substrate used in the present invention may be made of a polyolefin-based polymer, but is not limited thereto.

The porous substrate has preferably a thickness of 1 to 100 µm. Also, the porous substrate has a pore size of 0.01 to 50 µm and a porosity of 10 to 95%.

Preferably, the first porous coating layer has a thickness of 0.01 to 20 µm. Also, each of the second porous coating layer and the third porous coating layer has preferably a thickness of 0.01 to 20 µm. The fourth porous coating layer has preferably a thickness of 0.01 to 10 µm.

The separator of the present invention may be used in an electrochemical device comprising a cathode, an anode, a separator interposed between the cathode and the anode and an electrolyte solution. The preferred electrochemical device is a lithium secondary battery.

In addition, a method for manufacturing the separator of the present invention comprises (S1) preparing a planar porous substrate having multiple pores; (S2) coating an inorganic particle slurry obtained by dissolving a first binder polymer in a first solvent and dispersing inorganic particles therein on at least one surface of the porous substrate; (S3) coating a cathode active material particle slurry obtained by dissolving a second binder polymer in a second solvent and dispersing cathode active material particles and a first conductive material therein, an anode active material particle slurry obtained by dissolving a third binder polymer in a third solvent and dispersing anode active material particles and a second conductive material therein, or both of the cathode active material particle slurry and the anode active material particle slurry on the coated inorganic particle slurry; and (S4) simultaneously carrying out a dry-treatment for the second solvent and/or the third solvent together with the first solvent to first dry the second solvent and/or the third solvent and form the second porous coating layer and/or the third porous coating layer, thereby preventing the penetration of the first conductive material and/or the second conductive material into the pores of the porous substrate by the inorganic particle slurry, and then to dry the first solvent and form the first porous coating layer.

The method for manufacturing the separator of the present invention further comprises (S5) coating a solution comprising a fourth binder polymer on at least one outermost surface of the separator to form a fourth porous coating layer.

Advantageous Effects

The separator having porous active material coating layers comprising a conductive material according to the present invention can be used in a battery to provide very superior output characteristics due to the use of the conductive material and prevent the penetration of the conductive material into the pores of a porous substrate, thereby prohibiting a short circuit due to the use of the conductive material. Also, in the case that an electrode-separator adhesive layer is formed, the active material functions as a passage for transferring lithium ions, thereby preventing the transferring rate of lithium ions from being reduced.

Also, as porous coating layers are applied in both surfaces of a porous substrate, a short circuit between a cathode and an anode may be inhibited even if an electrochemical device is overheated, and thus the safety of the electrochemical device may be remarkably improved.

DESCRIPTION OF DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Hereinafter, preferred embodiments of the present invention will be described in detail with reference to the drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
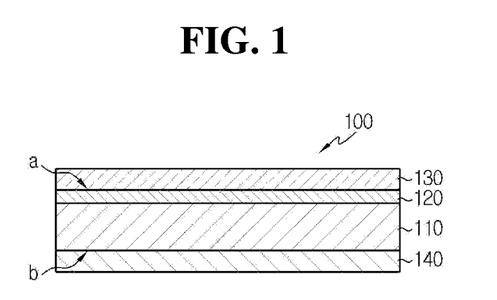
FIG. 1 shows the cross-section of a separator having a first porous coating layer formed on a first surface of a porous substrate in accordance with a preferred embodiment of the present invention.
Figure 2:
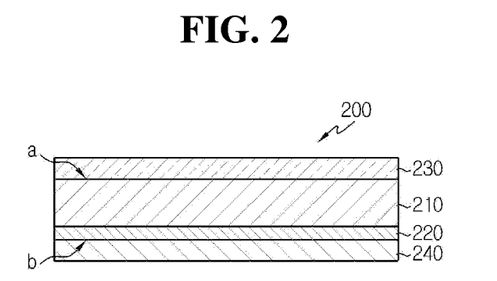
FIG. 2 shows the cross-section of a separator having a first porous coating layer formed on a second surface of a porous substrate in accordance with a preferred embodiment of the present invention.
Figure 3:
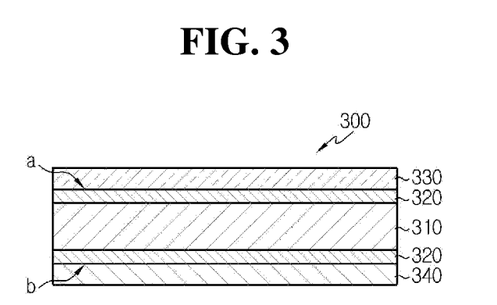
FIG. 3 shows the cross-section of a separator having a first porous coating layer formed on both surfaces of a porous substrate in accordance with a preferred embodiment of the present invention.

FIGS. 1 to 3 schematically illustrate an embodiment of the separator according to the present invention. However, the constitutions illustrated in embodiments and drawings disclosed herein are just preferable examples of the present invention, not intended to limit the sprit and scope of the present invention, so it should be understood that other equivalents and modifications could be made thereto.

Referring to FIGS. 1 and 2, the separator 100, 200 of the present invention comprises porous composite having a porous substrate 110, 210 and a first porous coating layer 120, 220 formed on at least one surface of the porous substrate 110, 210 and comprising a mixture of inorganic particles and a first binder polymer; and a second porous coating layer 130, 230 formed on a first surface (a) of the porous composite and comprising a mixture of cathode active material particles, a second binder polymer and a first conductive material, a third porous coating layer 140, 240 formed on a second surface (b) of the porous composite and comprising a mixture of anode active material particles, a third binder polymer and a second conductive material, or both of the second porous coating layer 130, 230 and the third porous coating layer 140, 240.

In the first porous coating layer 120, 220, the binder polymer allows the adhesion of inorganic particles so that the inorganic particles can be bound with each other, that is, the binder polymer connects and immobilizes the inorganic particle therebetween. Also, the inorganic particles are substantially present in contact with each other to form a closest packed structure in the porous coating layer, and an interstitial volume generated from the contact of the inorganic particles with each other becomes a pore of the first porous coating layer 120, 220.

In addition, in the second porous coating layer 130, 230 and the third porous coating layer 140, 240, similar to the first porous coating layer, the cathode active material particles or the anode active material particles adhere with each other by the binder polymer to have porosity due to an interstitial volume generated between active material particles. Further, in accordance with another aspect of the present invention, not only are both the second porous coating layer 130, 230 and the third porous coating layer 140, 240 comprised, but may comprise either one of the second porous coating layer 130, 230 or the third porous coating layer 140, 240. When only either one of the second porous coating layer 130, 230 or the third porous coating layer 140, 240 is comprised, one interface is reduced. The second porous coating layer 130, 230 and the third porous coating layer 140, 240 can comprise more inorganic particles. The second porous coating layer 130, 230 and the third porous coating layer 140, 240 have good thermal-stability to provide a separator with safety against heat, thereby preventing the shrink of the separator when an electrochemical device is overheated and thus prohibiting a short circuit of electrodes. Similarly, the first porous coating layer also improves the thermal safety of the separator.

In the second porous coating layer 130, 230 and the third porous coating layer 140, 240 of which are to improve the output characteristics of electrochemical devices, the binder polymer acts as a non-conductor to reduce electrical conductivity between active material particles, by which the output characteristics of electrochemical devices are difficult to be improved. Accordingly, in order to prevent the reduction of electrical conductivity between active material particles, a conductive material may be used to prevent the binder polymer from acting as a non-conductor and complement the insufficient electrical conductivity of the active material.

The conductive material, which is applied in the form of a slurry comprising active material particles and the conductive material during the manufacture of a separator, may have a particle size as small as several tens of nanometers to penetrate into a porous substrate having at least a pore size of several tens of micrometers, thereby providing the porous substrate which is non-conductive with electrical conductivity, to cause a short circuit between the electrodes of electrochemical devices. In order to overcome such a problem, the present invention applies the first porous coating layer 120, 220 to prevent the penetration of the conductive material into the porous substrate. In accordance with the present invention, in the method for manufacturing a separator, since the first porous coating layer 120, 220 is formed on at least one surface of the porous substrate 110, 210, the conductive material can be prevented from directly penetrating into the porous substrate 110, 210 even if an active material particle slurry comprising the conductive material is applied. Also, the first porous coating layer 120, 220 comprises inorganic particles to allow the improvement of the thermal stability of the separator.

Referring to FIG. 3, the separator 300 of the present invention comprises a porous substrate 310 and first porous coating layers 320 formed on both surface of the substrate.

Figure 4:
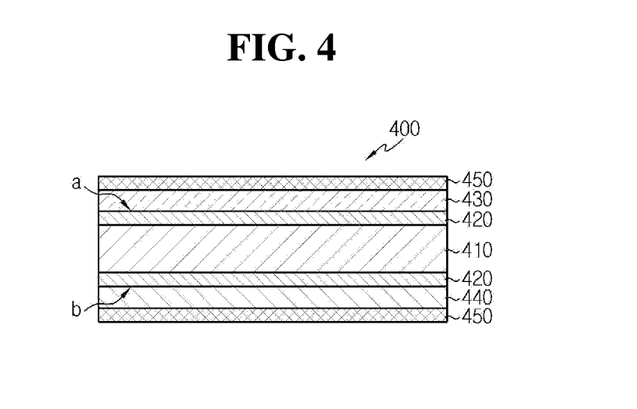
FIG. 4 shows the cross-section of a separator further having a fourth porous coating layer in accordance with a preferred embodiment of the present invention.

FIG. 4 schematically shows a separator further comprising a fourth porous coating layer in accordance with a preferred embodiment of the present invention. In FIG. 4, the separator 400 of the present invention further comprises the fourth porous coating layer 450 on at least one outermost surface thereof so as to improve its adhesiveness with electrodes. The fourth porous coating layer 450 corresponds to an electrode-separator adhesive layer and its formation may reduce the transferring rate of lithium ions due to a fourth binder polymer. However, since the separator 400 of the present invention has a second porous coating layer 430 and a third porous coating layer 440 comprising an active material, respectively, the active material functions as a passage for lithium ions to transfer, to prevent the transferring rate of lithium ions from being reduced.

The cathode active material particles which may be used in the present invention are not particularly limited to its kinds, but include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein, M1 and M2 are each independently selected from the group consisting of Al, Ni, Co, Fe, Mn, V, Cr, Ti, W, Ta, Mg and Mo, x, y and z are each independently an atomic fraction of elements consisting of an oxide, and $0 \leq x < 0.5$, $0 \leq y < 0.5$, $0 \leq z < 0.5$, and x+y+z<1), among these, LiFePO$_4$ is preferred. The anode active material particles which may be used in the present invention are not particularly limited to its kinds, but include natural graphite, artificial graphite, a carbon-based material, LiTi$_2$O$_4$, silicon (Si) and tin (Sn), among these, LiTi$_2$O$_4$ is preferred. Most preferably, the cathode active material particles is made of LiFePO$_4$ and the anode active material particles is made of LiTi$_2$O$_4$.

The conductive material which may be used in the present invention includes fine carbon powders, specifically carbon black, acetylene black, Ketjen Black, Super P and carbon natotubes, but is not particularly limited thereto.

The inorganic particles which may be used in the present invention include inorganic particles having a dielectric constant of 5 or higher and inorganic particles having the ability to transport lithium ions, but are not particularly limited thereto.

Preferably, examples of the inorganic particles having a dielectric constant of 5 or higher include BaTiO$_3$, Pb(Zr$_x$, Ti$_{1-x}$)O$_3$ (PZT, 0<x<1), Pb$_{1-x}$La$_x$Zr$_{1-y}$Ti$_y$O$_3$ (PLZT), (1−x)Pb (Mg$_{1/3}$Nb$_{2/3}$)O$_3$-xPbTiO$_3$ (PMN-PT, 0<x<1), hafnia (HfO$_2$), SrTiO$_3$, SnO$_2$, CeO$_2$, MgO, NiO, CaO, ZnO, ZrO$_2$, SiO$_2$, Y$_2$O$_3$, Al$_2$O$_3$, SiC and TiO$_2$ inorganic particles.

Also, examples of the inorganic particles having the ability to transport lithium ions include lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$ type glass (0<x<4, 0<y<13), lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5), lithium nitride (Li$_x$N$_y$, 0<x<4, 0<y<2), SiS$_2$ type glass (Li$_x$Si$_y$S$_z$, 0<x<3, 0<y<2, 0<z<4), P$_2$S$_5$ type glass (Li$_x$P$_y$S$_z$, 0<x<3, 0<y<3, 0<z<7) inorganic particles.

Examples of the binder polymer which may be used in the present invention include polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan and carboxymethyl cellulose, but are not particularly limited thereto.

The porous substrate used in the present invention may be any planar porous substrate which is conventionally used in electrochemical devices, such as a porous membrane or non-woven fabric form made of various polymers. For example, a polyolefin-based porous membrane which is used as a separator in electrochemical devices, particularly, a lithium secondary battery, or a non-woven fabric made of polyethylene terephthalate fiber may be used, and their material or form may be variously selected depending on a desired purpose. For example, the polyolefin-based porous membrane may be obtained from a polyolefin-based polymer, for example, polyethylene such as high-density polyethylene, linear low-density polyethylene, low-density polyethylene and ultra-high molecular weight polyethylene, polypropylene, polybutylene, polypentene or a mixture thereof, and the non-woven fabric may be obtained from a fiber made of such a polyolefin-based polymer or a polymer having higher heat-resistance than the polyolefin-based polymer.

The porous substrate has preferably a thickness of 1 to 100 μm. Also, the porous substrate has a pore size of 0.01 to 50 μm and a porosity of 10 to 95%.

Preferably, the first porous coating layer has a thickness of 0.01 to 20 μm. When the first porous coating layer has a thickness less than 0.01 μm, it is difficult to prevent the penetration of the conductive material. When the first porous coating layer has a thickness higher than 20 μm, the resistance of the separator increases to deteriorate battery performances. Meanwhile, the second porous coating layer and the third porous coating layer are not particularly limited to their thickness, but they each independently has preferably a thickness of 0.01 to 20 μm.

Also, the fourth porous coating layer has preferably a thickness of 0.01 to 10 μm. When the fourth porous coating layer has a thickness less than 0.01 μm, the density of the fourth binder polymer is too low to act as an electrode-separator adhesive layer. When the fourth porous coating layer has a thickness higher than 10 μm, the fourth binder polymer acts as a resistance layer which hinders the transfer of electron and lithium ions, thereby deteriorating the output of a lithium secondary battery.

The separator of the present invention may be manufactured by forming porous coating layers on a porous substrate, and its specific manufacturing method is as follows:

First, a planar porous substrate having multiple pores is prepared (S1).

The porous substrate may be any planar porous substrate which is conventionally used in electrochemical devices, such as a porous membrane or non-woven fabric form made of various polymers. For example, a polyolefin-based porous membrane which is used as a separator in electrochemical devices, particularly, a lithium secondary battery, or a non-woven fabric made of polyethylene terephthalate fiber may be used, and their material or form may be variously selected depending on a desired purpose. For example, the polyolefin-based porous membrane may be obtained from a polyolefin-based polymer, for example, polyethylene such as high-density polyethylene, linear low-density polyethylene, low-density polyethylene and ultra-high molecular weight polyethylene, polypropylene, polybutylene, polypentene or a mixture thereof, and the non-woven fabric may be obtained from a fiber made of such a polyolefin-based polymer or a polymer having higher heat-resistance than the polyolefin-based polymer. The porous substrate is not particularly limited to its thickness, but has preferably a thickness of 1 to 100 μm, more preferably 5 to 50 μm. Also, the porous substrate is not particularly limited to its pore size and porosity, but has a pore size thickness of 0.001 to 50 μm and a porosity of 10 to 95%.

Next, an inorganic particle slurry obtained by dissolving a first binder polymer in a first solvent and dispersing inorganic particles therein is coated on at least one surface of the porous substrate (S2).

The inorganic particles are not particularly limited if they are electrochemically stable. That is, the inorganic particles which may be used in the present invention are not particularly limited if an oxidation-reduction reaction does not occur in an operating voltage range (for example, 0 to 5 V based on Li/Li$^+$) of an applied electrochemical device. Particularly, inorganic particles having a high dielectric constant may be used to increase a dissociation rate of an electrolyte salt, e.g., a lithium salt, in a liquid electrolyte, thereby improving an ionic conductivity of the electrolyte. Specific examples of the inorganic particles which may be used in the present invention are as mentioned above.

Also, the inorganic particles are not particularly limited to their size, but have preferably an average particle diameter of 0.001 to 10 μm so as to achieve the uniform thickness of a coating layer and a suitable porosity. When the inorganic particles have an average particle diameter less than 0.001 µm, their dispersion may be deteriorated. When the inorganic particles have an average particle diameter higher than 10 µm, the thickness of the coating layer increases.

The first binder has preferably a glass transition temperature ($T_g$) of −200 to 200° C. so as to improve the mechanical properties such as flexibility and elasticity of the coating layer finally formed.

Also, the first binder polymer is not necessarily required to have ionic conductivity, but, a polymer having ionic conductivity may be used to improve the performances of electrochemical devices. Accordingly, the first binder polymer used in the present invention preferably includes one having a high dielectric constant. Actually, the dissociation rate of a salt in an electrolyte solution depends on a dielectric constant of the electrolyte solution. Therefore, as the dielectric constant of the first binder polymer is higher, the dissociation rate of a salt in an electrolyte solution increases. In this regard, in the present invention, the first binder polymer may have a dielectric constant of 1.0 to 100 (measuring frequency=1 kHz), preferably 10 or higher.

In addition, the first binder polymer may be gelatinized when impregnated with a liquid electrolyte solution to exhibit a high wettability with the electrolyte solution. In this regard, it is preferred that the first binder polymer has a solubility parameter of 15 to 45 MPa$^{1/2}$, more preferably 15 to 25 MPa$^{1/2}$, most preferably 30 to 45 MPa$^{1/2}$. Accordingly, a hydrophilic polymer having many polar groups is favorably used as compared to a hydrophobic polymer such as polyolefine. When the solubility parameter of the polymer is less than 15 MPa$^{1/2}$ or higher than 45 MPa$^{1/2}$, the polymer is difficult to be impregnated with a conventional liquid electrolyte solution for a battery.

Non-limiting examples of the first binder polymer include polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan and carboxymethyl cellulose.

The inorganic particles and the first binder polymer are preferably used in a weight ratio of 50:50 to 99:1, more preferably 70:30 to 95:5. When the weight ratio of the inorganic particles and the first binder polymer is less than 50:50, the amount of the polymer increases to reduce the pore size and porosity of the coating layer formed. When the amount of the inorganic particles is higher than 99 parts by weight, the amount of the polymer decreases to lower the anti-peeling property of the coating layer formed.

The solvent for the first binder polymer (i.e., the first solvent) preferably has a solubility parameter similar to that of the first binder polymer to be used and a low boiling point, so as to achieve uniform mixture and easy removal of the solvent afterward. Non-limiting examples of the solvent which may be used in the present invention include acetone, tetrahydrofuran, methylene chloride, chloroform, dimethylformamide, N-methyl-2-pyrrolidone (NMP), cyclohexane, water, and a mixture thereof.

The inorganic particle slurry is obtained by dissolving the first binder polymer in the first solvent, then adding and dispersing inorganic particles therein. The inorganic particles may be added in a suitably pulverized form, but they are preferably instantly added in the solution of the first binder polymer and then pulverized with dispersing by means of a milling process such as a ball-mill method.

Then, on the coated inorganic particle slurry, a cathode active material particle slurry obtained by dissolving a second binder polymer in a second solvent and dispersing cathode active material particles and a first conductive material therein, an anode active material particle slurry obtained by dissolving a third binder polymer in a third solvent and dispersing anode active material particles and a second conductive material therein, or both of the cathode active material particle slurry and the anode active material particle slurry is coated (S3).

The second binder polymer, the third binder polymer, the second solvent and the third solvent may each independently be the same as the first binder polymer and the first solvent mentioned above. The first binder polymer, the second binder polymer and the third binder polymer may be the same or different, and the first solvent, the second solvent and the third solvent may be the same or different.

The cathode active material particles are not particularly limited to its kinds, but include $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein, M1 and M2 are each independently selected from the group consisting of Al, Ni, Co, Fe, Mn, V, Cr, Ti, W, Ta, Mg and Mo, x, y and z are each independently an atomic fraction of elements consisting of an oxide, and $0 \leq x < 0.5$, $0 \leq y < 0.5$, $0 \leq z < 0.5$, and $x+y+z<1$), among these, $LiFePO_4$ is preferred. The anode active material particles which may be used in the present invention are not particularly limited to its kinds, but include natural graphite, artificial graphite, a carbon-based material, $LiTi_2O_4$, silicon (Si) and tin (Sn), among these, $LiTi_2O_4$ is preferred.

Also, the conductive material includes fine carbon powders, specifically carbon black, acetylene black, Ketjen Black, Super P and carbon natotubes, but is not particularly limited thereto.

The active material particle slurry(s) may be prepared by dissolving the second binder polymer and/or the third binder polymer in the second solvent and/or the third solvent, then adding and dispersing active material particles and a conductive material therein. The active material particles may be added in a suitably pulverized form, but they are preferably instantly added in the solution of the binder polymer and then pulverized with dispersing by means of a milling process such as a ball-mill method. Optionally, the active material particle slurry(s) may comprise inorganic particles.

The coating step (S2) of the inorganic particle slurry and the coating step (S3) of the active material particle slurries may be sequentially or non-sequentially carried out by various methods including slot-die coating, slide coating and curtain coating. In particular, it is preferred that the slurry coating of (S2) and the binder solution coating of (S3) is sequentially or simultaneously carried out in terms of productivity, and the most preferred embodiment is shown in FIG. 5.

Figure 5:
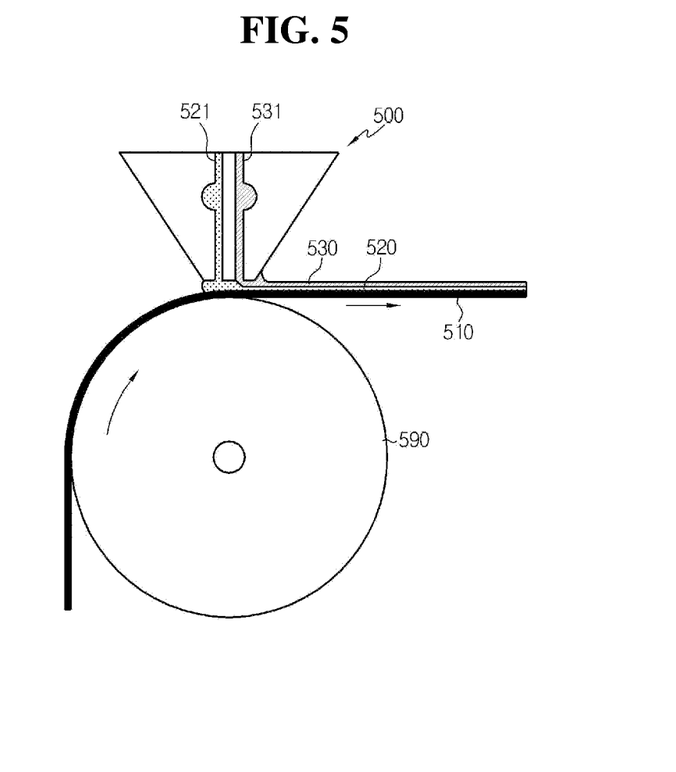
FIG. 5 is a schematic diagram showing the procedures for manufacturing a separator in accordance with a preferred embodiment of the present invention.

Referring to FIG. 5, in order to carry out the coating step (S2) of the inorganic particle slurry and the coating step (S3) of the active material particle slurries, a die 500 having two slots 521 and 531 is used. An inorganic particle slurry 520 obtained by dissolving a first binder polymer in a first solvent and dispersing inorganic particles therein is supplied by the first slot 521. Also, an active material particle slurry 530 is supplied by the second slot 531. When a porous substrate 510 is supplied by a rotating roller, the inorganic particle slurry 520 is coated on the porous substrate 510, and the active material particle slurry 530 is sequentially coated on the inorganic particle slurry 520.

Finally, the solvent present in the active material particle slurry and the first solvent are simultaneously treated in a drying method.

That is, when one of the cathode active material particle slurry and the anode active material particle slurry is used, the solvent present in the used slurry and the first solvent are simultaneously treated in a drying method, and when both of the cathode active material particle slurry and the anode active material particle slurry are used, the solvents present in both slurries and the first solvent are simultaneously treated in a drying method.

As mentioned above, the second solvent and/or the third solvent together with the first solvent are simultaneously subject to a dry-treatment to first dry the second solvent and/or the third solvent and form the second porous coating layer and/or the third porous coating layer, thereby preventing the penetration of the first conductive material and/or the second conductive material into the pores of the porous substrate by the inorganic particle slurry, and then to dry the first solvent and form the first porous coating layer (S4). In step (S4) of the present invention, it is preferred that the second solvent and/or the third solvent present in the active material particle slurry(s) and the first solvent present in the inorganic particle slurry are simultaneously subject to a dry-treatment for the following reasons.

When the resultant of step (S3) is treated in a dryer, the second solvent and/or the third solvent in the active material particle slurry(s) coated on the outermost surface are first dried prior to the first solvent in the inorganic particle slurry. That is, the second solvent and/or the third solvent are first dried to connect and immobilize the active material particles and the conductive material with each other by the binder polymer(s), while forming the second porous coating layer and/or the third porous coating layer. Then, the first solvent in the inorganic particle slurry is dried later to connect and immobilize the inorganic particles with each other by the first binder polymer, while forming the first porous coating layer having pores generated by an interstitial volume between the inorganic particles.

Thus, since the second solvent and/or the third solvent present in the active material particle slurry(s) are dried to first form the outermost layer of the second porous coating layer and/or the third porous coating layer before drying the first solvent in the inorganic particle slurry, no or little conductive material penetrates between the inorganic particles to effectively prevent the penetration of the conductive material into the pores of the porous substrate due to the first porous coating layer.

Further, a solution comprising a fourth binder polymer may be coated on at least one outermost surface of the separator to form a fourth porous coating layer (S5).

The separator of the present invention may optionally have the additional fourth porous coating layer comprising the fourth binder polymer, which is formed on at least one outermost surface thereof, and the fourth porous coating layer may be formed by coating a solution obtained by dissolving the fourth binder polymer in a solvent on the surface of the second porous coating layer or the third porous coating layer. Alternatively, the inorganic particle slurry, the active material particle slurry(s) and the fourth binder polymer solution may be subsequently coated by using three slot-dies similar to two slot-dies of FIG. 5.

Also, the fourth porous coating layer may be formed by electrocoating the fourth binder polymer solution by means of a kind of injection, and the fourth binder polymer solution may be obtained by dissolving the fourth binder polymer in a solvent or further heating the fourth binder polymer to melt. The electrocoating by a kind of injection is well-known in the art and is generally carried out by applying a high voltage in a solution to generate electric charge in the solution and injecting the solution through an injection nozzle having fine size or a spray head for generating droplets to a substrate. The electrocoating may include electrospinning and electrospraying. The Korean Laid-open Patent Publication No. 2009-0054385 discloses an electrospinning process using an electrospining device comprising a syringe (a syringe pump), an injection needle, a bottom electrode (the drum of a stainless steel sheet, which can control a rotating speed) and a means for supplying a spinning voltage, wherein the distance between the tip of the injection needle and the drum is 5 to 30 cm, the spinning voltage is 15 kV or higher, and the flow rate of a spinning solution in the syringe pump is controlled to 1 to 20 ml/hr. Also, the Korean Patent Publication No. 0271116 discloses an electrospray coating apparatus and process. The above documents are incorporated herein by reference.

Alternatively, the fourth porous coating layer may be formed by a phase separation process, wherein a coating slurry is mixed with a non-solvent having a boiling point higher than that of the solvent of the slurry so that a binder polymer in the slurry can exist on the surface of a coating layer as the percentage of the non-solvent increases during drying, and after coating the slurry, the binder polymer is immersed in a non-solvent bath so that the binder polymer can selectively exist on the surface of the coating layer. Also, after coating, the non-solvent is introduced in its gas state during drying, to control the binder polymer to exist on the surface of the coating layer by means of the condensation of the non-solvent while the solvent is dried.

The separator of the present invention thus prepared may be used as a separator in an electrochemical device. That is, the separator of the present invention may be effectively used as one interposed between a cathode and an anode. The electrochemical device include any device in which electrochemical reactions may occur, and specific examples of the electrochemical device include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

The electrochemical device may be manufactured by a conventional method known in the art, for example, by interposing the foregoing separator between a cathode and an anode and introducing an electrolyte solution.

The separator of the present invention may be used together with any electrode which is not particularly limited, and the electrode may be manufactured by binding an electrode active material to an electrode current collector according to a conventional method known in the art. A cathode active material may be any of those that are commonly used in cathodes of conventional electrochemical devices. Non-limiting examples of the cathode active material include lithium manganese oxides, lithium cobalt oxides, lithium nickel oxides, lithium iron oxides, and lithium composite oxides thereof. An anode active material may be any of those that are commonly used in anodes of conventional electrochemical devices. Non-limiting examples of the anode active material include lithium, lithium alloys, and lithium intercalation materials such as carbon, petroleum coke, activated carbon, graphite and other carbonaceous materials. Non-limiting examples of a cathode current collector include aluminum foils, nickel foils and a combination thereof. Non-limiting examples of an anode current collector include copper foils, gold foils, nickel foils, copper alloy foils and a combination thereof.

The electrochemical device of the present invention can use an electrolyte consisting of a salt and an organic solvent capable of dissolving or dissociating the salt. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof.

The electrolyte may be introduced in any suitable step during the manufacturing of a battery depending on the manufacturing processes and desired physical properties of a final product. Specifically, the electrolyte may be introduced before battery assembly or in the final step of battery assembly.

MODE FOR INVENTION

Hereinafter, various preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

EXAMPLE

Example 1

Manufacture of Separator Having Inorganic-Organic Coating Layer/Conductive Material-Comprised Active Material Coating Layer Polyvinylidene fluoride-chlorotrifluoroethylene copolymer (PVdF-CTFE) and cyanoethylpullulan in a weight ratio of 10:2 were each added to acetone and dissolved at for about 12 hours to obtain a polymer solution. $Al_2O_3$ powders were added to the polymer solution until the weight ratio of polymer/inorganic particles reached 5/95, and then the inorganic particles were pulverized and dispersed by using a ball-mill method for 12 hours, to prepare a first slurry.

Also, to the polymer solution obtained above, $LiFePO_4$ powders comprising a conductive material in an amount of 2% were added until the weight ratio of polymer/inorganic particles reached 10/90, and then the inorganic particles were pulverized and dispersed by using a ball-mill method for 12 hours, to prepare a second slurry.

In addition, to the polymer solution obtained above, $LiTi_2O_4$ powders comprising a conductive material in an amount of 2% were added until the weight ratio of polymer/inorganic particles reached 10/90, and then the inorganic particles were pulverized and dispersed by using a ball-mill method for 12 hours, to prepare a third slurry.

The first slurry and the second slurry prepared above were coated on one surface of a porous polyolefine membrane (Celgard, C210) having a thickness of 16 μm as a porous substrate, in which the first slurry was a lower layer and the second slurry was an upper layer. Subsequently, the third slurry was coated on the opposite surface of the substrate by a roll-coating method. Then, the coated porous substrate was dried in an oven set to 70° C., to prepare a separator.

Example 2

Manufacture of Separator Having Inorganic-Organic Coating Layer/Conductive Material-Comprised Active Material Coating Layer/Binder Polymer Layer The procedures of Example 1 were repeated to prepare a separator, and then a solution of polyvinylidene fluoride-chlorotrifluoroethylene copolymer (PVdF-CTFE) was coated on both surfaces of the separator in a thickness of 3 μm by an electrospraying process, to obtain a separator having an electrode-separator adhesive layer.

Example 3

Manufacture of Separator Having Inorganic-Organic Coating Layer/Conductive Material-Comprised Active Material Coating Layer/Binder Polymer Layer The procedures of Example 1 were repeated except that the third slurry was not coated to prepare a separator, and then the same electrospraying process as Example 2 was carried out, to obtain a separator having an electrode-separator adhesive layer.

Comparative Example 1

Manufacture of Separator Having Conductive Material-Comprised Active Material Coating Layer The procedures of Example 1 were repeated except that the first slurry was not used to prepare a separator.

Comparative Example 2

Manufacture of Separator Having No Conductive Material-Comprised Active Material Coating Layer The procedures of Example 1 were repeated except that a conductive material was not used in the preparation of the second slurry and the third slurry, to prepare a separator.

Comparative Example 3

Manufacture of Separator Having No Conductive Material-Comprised Active Material Coating Layer The procedures of Example 2 were repeated except that a conductive material was not used in the preparation of the second slurry and the third slurry, to prepare a separator.

Test Example 1

Evaluation of Stability for Separator

The separators prepared in Examples 1 to 3 were interposed between a cathode and an anode, and then an electrolyte solution was introduced, to prepare a lithium secondary battery. The lithium secondary battery was charged and confirmed for its operation performance.

However, it is confirmed that a lithium secondary battery prepared by using the separator of Comparative Example 1 was self-discharged during storage after primary charging, thereby failing to be used as a secondary battery.

Test Example 2

Evaluation of Output Characteristics for Electrochemical Device

Each electrode assembly prepared by using the separators prepared in Examples 1 and 2 and Comparative Examples 2 and 3 were measured for its output for 2 seconds in various states of charge (SOC), and the results thereof are shown in Table 1.

TABLE 1

| SOC | Example 1 | Example 2 | Example 3 | Com. Example 1 | Com. Example 3 |
|---|---|---|---|---|---|
| 95% | 86 W | 79 W | 78 W | 83 W | 76 W |
| 50% | 67 W | 63 W | 61 W | 64 W | 59 W |
| 30% | 54 W | 51 W | 49 W | 52 W | 47 W |

From Table 1, it can be seen that the electrode assemble using the separator prepared in Example 1 has good output in all SOC areas, as compared with the electrode assemble using the separator prepared in Comparative Example 2. Also, the electrode assembles using the separators prepared in Examples 2 and 3 have good output in all SOC areas, as compared with the electrode assemble using the separator prepared in Comparative Example 3.

EXPLANATION OF DRAWING SIGNALS

100, 200, 300, 400: Separator
110, 210, 310, 410, 510: Porous Substrate
120, 220, 320, 420, 520: First Porous Coating Layer
130, 230, 330, 430, 530: Second Porous Coating Layer
140, 240, 340, 440: Third Porous Coating Layer
450: Fourth Porous Coating Layer
500: Slot-Die
521: Inorganic Particle Slurry
531: Active Material Particle Slurry
590: Guide Roll

What is claimed is:

1. An electrochemical device comprising:
   a cathode, an anode, a separator interposed between the cathode and the anode, and an electrolyte solution, wherein the separator comprises:
   a porous composite having a porous substrate and a first porous coating layer formed on at least one surface of the porous substrate, wherein the first porous coating layer comprises a mixture of inorganic particles and a first binder polymer wherein the inorganic particles are immobilized by the first binder polymer, the first porous coating layer having pores defined by interstitial volumes between the inorganic particles; and
   a second porous coating layer formed on a first surface of the porous composite wherein the second porous coating layer comprises a mixture of cathode active material particles, a second binder polymer and a first conductive material; and
   a third porous coating layer formed on a second surface of the porous composite wherein the third porous coating layer comprises a mixture of anode active material particles, a third binder polymer and a second conductive material.

2. The electrochemical device according to claim 1, wherein the separator further comprises a fourth porous coating layer formed on the surface of the second porous coating layer, the surface of the third porous coating layer or the surfaces of both the second porous coating layer and the third porous coating layer, wherein the fourth porous coating layer consists of a fourth binder polymer.

3. The electrochemical device according to claim 1, wherein the cathode active material particles are selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein, M1 and M2 are each independently selected from the group consisting of Al, Ni, Co, Fe, Mn, V, Cr, Ti, W, Ta, Mg and Mo, x, y and z are each independently an atomic fraction of elements consisting of an oxide, and $0 \leq x < 0.5$, $0 \leq y < 0.5$, $0 \leq z < 0.5$, and $x+y+z<1$), and a mixture thereof.

4. The electrochemical device according to claim 1, wherein the anode active material particles are selected from the group consisting of natural graphite, artificial graphite, a carbon-based material, $LiTi_2O_4$, silicon (Si), tin (Sn) and a mixture thereof.

5. The electrochemical device according to claim 1, wherein the cathode active material particles are made of $LiFePO_4$ and the anode active material particles are made of $LiTi_2O_4$.

6. The electrochemical device according to claim 1, wherein the first conductive material and the second conductive material are each independently selected from the group consisting of carbon black, acetylene black, Ketjen Black, Super P, carbon natotubes and a mixture thereof.

7. The electrochemical device according to claim 1, wherein the inorganic particles are selected from the group consisting of inorganic particles having a dielectric constant of 5 or higher, inorganic particles having the ability to transport lithium ions, and a mixture thereof.

8. The electrochemical device according to claim 7, wherein the inorganic particles having a dielectric constant of 5 or higher are selected from the group consisting of $BaTiO_3$, $Pb(Zr_x,Ti_{1-x})O_3$ (PZT, $0<x<1$), $Pb_{1-x}La_xZr_{1-y}Ti_yO_3$ (PLZT), $(1-x)Pb(Mg_{1/3}Nb_{2/3})O_3$-$xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$ inorganic particles and a mixture thereof.

9. The electrochemical device according to claim 7, wherein the inorganic particles having the ability to transport lithium ions are selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) particles, and a mixture thereof.

10. The electrochemical device according to claim 1, wherein the first binder polymer, the second binder polymer and the third binder polymer are each independently selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and a mixture thereof.

11. The electrochemical device according to claim 2, wherein the fourth binder polymer is selected from the group consisting of polyvinylidene fluoride-co-hexafluoropropylene, polyvinylidene fluoride-co-trichloroethylene, polymethyl methacrylate, polybutyl acrylate, polyacrylonitrile, polyvinylpyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, and a mixture thereof.

12. The electrochemical device according to claim 1, wherein the porous substrate is made of a polyolefin-based polymer.

13. The electrochemical device according to claim 1, wherein the porous substrate has a thickness of 1 to 100 µm.

14. The electrochemical device according to claim 1, wherein the porous substrate has a pore size of 0.01 to 50 µm and a porosity of 10 to 95%.

15. The electrochemical device according to claim 1, wherein the first porous coating layer has a thickness of 0.01 to 20 µm.

16. The electrochemical device according to claim 1, wherein the second porous coating layer and the third porous coating layer have each independently a thickness of 0.01 to 20 µm.

17. The electrochemical device according to claim 2, wherein the fourth porous coating layer has a thickness of 0.01 to 10 µm.

18. The electrochemical device according to claim 1, which is a lithium secondary battery.

* * * * *